Sept. 15, 1959 E. G. FRIDRICH 2,904,457
MANUFACTURE OF CONDUCTIVE GLASS PAPER
Filed Dec. 10, 1957

Inventor:
Elmer G. Fridrich,
by
His Attorney.

2,904,457
MANUFACTURE OF CONDUCTIVE GLASS PAPER

Elmer G. Fridrich, Cleveland, Ohio, assignor to General Electric Company, a corporation of New York Application December 10, 1957, Serial No. 701,867

5 Claims. (Cl. 117—229)

This invention relates in general to electroconductive coatings on glass and similar vitreous material and more particularly to the manufacture of conducting glass cloth or paper wherein the glass fibers are coated with an indium containing compound.

Glass paper consists of fine glass fibers, preferably having a diameter on the order of 1 micron or less, which may be matted or felted together through self-adhesion or through the use of a binder, for instance 5 to 15% organic binder such as polyvinyl acetate. Glass cloth on the other hand is made by first forming fine glass fibers or strands into yarn which yarn is subsequently woven into cloth. Glass paper or cloth may be made conductive by forming on the surface of the fibers an electrically conducting iridized metal oxide film integrally united with the surface. Metals suitable for forming such films are tin, indium and cadmium. Conducting glass paper is particularly useful for use as the transparent conductive plate in electroluminescent cells of a flexible type wherein a thin layer of electroluminescent phosphor is sandwiched between two conducting surfaces across which a voltage is applied to excite the phosphor.

In the copending application Serial No. 347,617 filed April 8, 1953, of Mary S. Jaffe entitled "Conductive Coating on Glass" and assigned to the same assignee as the present invention, now Patent 2,849,339, there is described and claimed a process and suitable materials for making conductive glass paper or cloth. The process consists in flowing onto the fibrous glassy material a solution of indium basic trifluoroacetate $In(OH)(CF_3COO)_2$ with added tin salt such as stannic chloride $SnCl_4$ dissolved in an organic solvent such as ethylene glycol monoethyl ether acetate (Cellosolve acetate of Carbide and Carbon Chemicals Corporation), drying the material, then baking it for 5 to 10 minutes at a temperature of 600 to 700° C. The indium salt solution is drawn by capillary action into the spaces between the fibers and the conducting coating, consisting primarily of indium sesquioxide, then envelops the individual fibers of the paper or cloth, resulting in a higher conductivity per square.

The object of the invention is to provide a new and improved process for applying a conductive coating of an indium containing compound to a fibrous glass sheet through the use of indium basic trifluoroacetate.

Another object of the invention is to provide an improved process better adapted to continuous production techniques.

Yet another object of the invention is to provide an improved process resulting in a lower resistance per square and less discoloration of the glass paper.

In accordance with the invention, I have discovered that improved results, namely lower resistance per square and less discoloration, are achieved when the glass paper, after having been dipped in indium basic trifluoroacetate, is subjected to radiant heat for a relatively short period of time under forced ventilation. A preferred mode consists in subjecting the paper to infrared radiation for a period less than a minute under a forced oxygen flow.

Micro-fiber glass paper made conductive in this fashion exhibits a resistance as low as 100 ohms per square and is almost colorless, as against a resistance in the range of 1000 ohms per square and a yellow cast achieved by the methods practiced heretofore.

For further objects and advantages and for a detailed description of a preferred mode of the process embodying the invention along with equipment suitable for the practice thereof, attention is now directed to the following description and accompanying drawing. The features of the invention believed to be novel will be more particularly pointed out in the appended claims.

Figure 1:
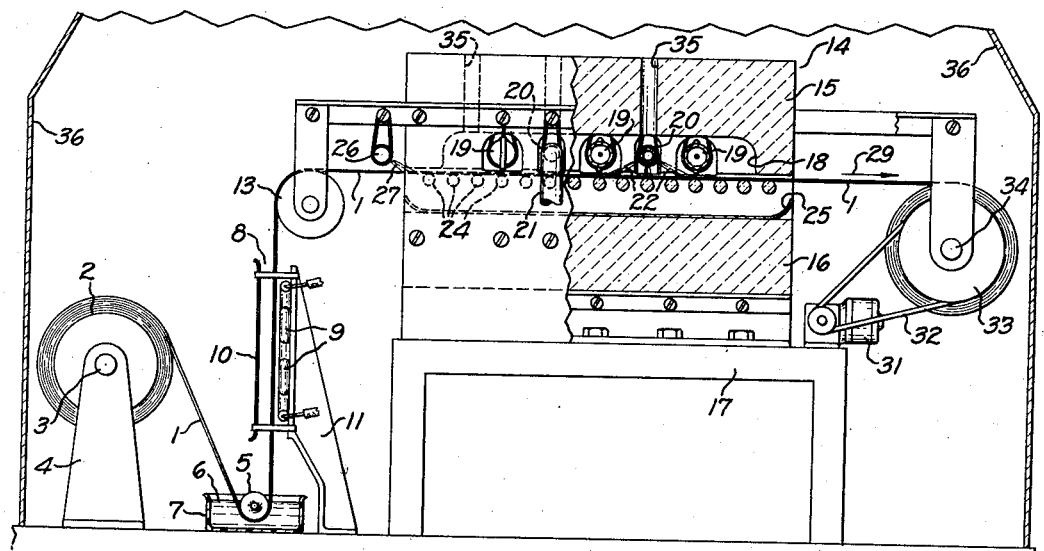
Fig. 1 is a side elevational view, partly schematic in form, of an apparatus for the practice of the process of the invention.
Figure 2:
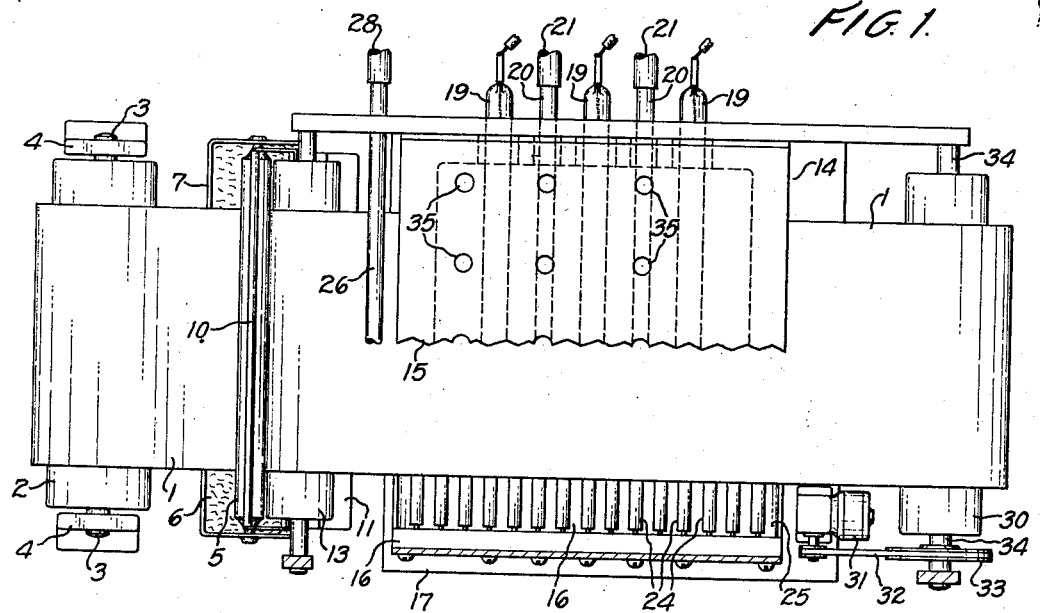
Fig. 2 is a plan view of the same apparatus.

Referring to the drawing and more particularly to Fig. 1, the illustrated apparatus provides for the continuous processing of glass paper drawn in a band or tape 1 from a spool 2 supported on a shaft 3 journalled on brackets 4. A glass paper currently being used for the manufacture of laminated flexible electroluminescent cells has a nominal thickness of 2 mils and a width of 6 inches is obtainable in spools of several hundred feet. A suitable glass paper of this kind is marketed by American Machine and Foundry Company under the designation Tissue Glass 200B.

The band of paper 1 is drawn downwardly off the spool and around a glass roller 5 partially immersed in a bath 6 of indium basic trifluoroacetate contained in a polyethylene tray 7. The coating bath consists of indium basic trifluoroacetate $In(OH)(CF_3COO)_2$ and between 4% and 16% stannic tetrachloride $SnCl_4$ on the basis of moles of tin relative to total moles of indium plus tin in a suitable solvent. A preferred proportion of stannic chloride provides approximately 8% moles of tin relative to total moles of indium plus tin. Suitable solvents are the "Cellosolve Acetate" of Carbide and Carbon Chemicals Corporation, consisting of ethylene glycol monoethyl ether acetate or 1,4 dioxane (diethylene dioxide). A preferred mixed type solvent consists of equal parts by weight of triethylene glycol dimethyl ether and "Cellosolve Acetate." The proportion of solvent to indium basic trifluoroacetate and stannic tetrachloride is adjusted to provide fluid properties in the nature of a thin varnish.

The glass paper band soaked in the coating varnish then passes vertically upward through a drier unit 8 comprising a bank of sheathed electric resistance heaters 9 and a facing heat reflector plate 10 supported on a pedestal 11. As the paper passes through the drier, the volatile solvents are driven off and the varnish dries to a thin hard non-tacky film.

The paper band 1 then passes around a roller 13 and is drawn horizontally through the baking oven 14. The oven, shown partially sectioned, comprises upper and lower blocks 15, 16 of fire brick supported on a framework 17. Upper block 15 is provided with a flat or pan-like cavity 18 with slots on the lateral sides to accommodate three infrared tubular quartz heat lamps 19 and a pair of oxygen supply tubes 20 interposed between them. The tubular heat lamps, which may be of 1000-watt rating, are longer than the width of the glass paper band in order to subject it to an even heat across its entire width, and have their ends projecting beyond the sides of the fire brick. The oxygen supply tubes 20 are supplied with oxygen from both ends through flexible supply tubes 21 and have small apertures in their undersides to direct jets 22 of oxygen against the glass paper band.

The glass paper passes over a grid consisting of a series of transverse quartz rods 24 supported above a polished aluminum tray 25 serving as a heat reflector. The quartz rod grid 24 and heat reflector 25 are supported on the lower firebrick block 16. A sheet of mica-mat (not shown) is preferably laid over the quartz rod grid and assists in supporting the glass paper and prevents it from bowing down between the rods 24. A tube 26 positioned in front of the slot where the glass paper band enters the oven 14 directs a blast of air 27 into the entrance, being supplied with compressed air through a hose 28. The air blast confines any flame due to the reaction of the InBTFA film within the oven and prevents flame from flashing back over the paper band towards the drier and dipping tray 7. After passing through the oven, the glass paper, moving in the direction of the arrow 29, is wound around a large diameter drum 30. The paper is now conductive and more brittle and fragile than formerly and must be handled gently. The drum 30 is driven slowly by an electric motor 31 provided with a reduction gear and coupled through a belt 32 to a pulley 33 fast on shaft 34 of the drum.

As the paper is drawn through the furnace, the InBTFA varnish decomposes and oxydizes in the oxygen atmosphere liberating carbon dioxide, fluorine water vapor, and intermediate compounds thereof. Any organic binder in the paper is also decomposed or oxydized and driven off. A water-insoluble, transparent and electrically conducting compound of indium remains as a film on the glass fibers of the paper. The film is believed to be indium sesquioxide with substituted tin and possibly with some substituted fluorine in oxygen sites within the lattice.

The temperature within the furnace may be regulated by adjusting the supply of oxygen through the tubes 20 or the wattage to the heat lamps 19. It is extremely difficult to measure the temperature at the surface of the glass paper but it is less than 600° C. and probably in the range of 350 to 550° C. after decomposition of the InBTFA varnish. Since the paper is heated by infrared radiation rather than by means of a hot ambient atmosphere, it may become hotter than the ambient gases and this factor appears to have a bearing on the improved results obtained with the present process. The infrared radiation heats preferentially any areas which are underfired and therefore dark and absorbing. After the varnish is fired, absorption of radiant energy decreases and the paper is tempered by the relatively cool gases. The total heat input from the quartz lamps into the furnace for treating a paper of 6 inch width may be approximately 4000 watts and the energy concentration on the paper may be approximately 50 watts per square inch. The flow of oxygen directed on the paper under these circumstances is approximately 10 to 15 liters per minute at atmospheric pressure. The supply of air and oxygen keeps the decomposition products diluted below combustible concentration. The oxydation and decomposition products contain fluorine and are toxic. They escape from the oven through the apertures 35 in upper fire brick block 15. The entire apparatus is contained and operated in a closed hood 36, partly shown in Fig. 1, provided with forced ventilation.

If the energy input into the furnace is increased substantially, the paper comes out with a decidedly yellow cast and exhibits a higher resistance per square. The variables which control the temperature, namely the oxygen supply rate and the wattage input into the heat lamps are adjusted so that the paper comes out almost colorless and having just a faint yellow tint. This results in a conductive coating of good stability and low resistance, of the order of 100 ohms per square, as compared with resistances of the order of 1000 ohms per square obtained by former methods. The paper, being less yellow, transmits more light and this is a definite advantage for an electroluminescent cell using such paper. Glass paper so produced may be cut into squares and laminated into an electroluminescent lamp encased in a thin envelope of polyethylene, as disclosed and claimed in copending application Serial No. 701,906 filed of even date herewith, of Elmer G. Fridrich and Paul A. Dell, entitled "Electroluminescent Lamp and Manufacture Thereof" and assigned to the same assignee as the present invention.

The reasons for the improved results as regards light transmittance and conductivity obtained in coatings made in accordance with the invention are not fully understood. The results may be due to the different rate and temperature of formation of the conductive coating or crystals of the compound of indium on the glass fibers.

While a specific mode for practicing the process of the invention along with preferred equipment therefor have been described in detail, the same are intended as illustrative and not in order to limit the invention thereto. The scope of the invention is to be determined by the appended claims.

What I claim as new and desire to secure by Letters Patent of the United States is:

1. The method of making conductive a sheet of glass fibers which comprises impregnating the sheet with a varnish of indium basic trifluoroacetate, drying the varnish, then subjecting the sheet to predominantly infrared radiant heat in an oxidizing atmosphere at an intensity sufficient to decompose the varnish to a stable water insoluble and electrically conducting compound of indium coating the fibers of the glass sheet.

2. The method of making conductive a sheet of glass fibers which comprises impregnating the sheet with a varnish of indium basic trifluoroacetate, drying the varnish, then simultaneously subjecting the sheet to predominantly infrared radiant heat while blowing oxygen thereon, the intensity of radiant heat being sufficient to decompose the varnish to a stable water-insoluble and electrically conducting compound of indium coating the fibers of the glass sheet.

3. The method of making conductive a sheet of glass fibers which comprises drawing the sheet through a bath of a varnish of indium basic trifluoroacetate to impregnate it with the varnish, passing the sheet through a drier to dry the varnish, then passing the sheet through an oven supplied with oxygen and wherein the sheet is subjected to predominantly infrared radiant heat at an intensity sufficient to decompose the varnish to a stable water insoluble and electrically conducting compound of indium coating the fibers of the glass sheet.

4. The method of making conducting a sheet of glass fibers which comprises impregnating the sheet with a varnish of indium basic trifluoroacetate in an organic vehicle, drying the varnish to expel the vehicle, then subjecting the sheet to predominantly infrared radiant heat in an oxidizing atmosphere, the intensity of radiant heat being sufficient to decompose the varnish to a stable water-insoluble and electrically conducting compound of indium coating the fibers of the glass sheet and to produce at most a slight yellowish tint to the sheet whereby to achieve high conductivity and high light transmittance.

5. The method of making conducting a sheet of glass fibers which comprises impregnating the sheet with a varnish of indium basic trifluoroacetate in an organic vehicle, drying the varnish to expel the vehicle, then subjecting the sheet to predominantly infrared radiant heat while blowing oxygen thereon, the intensity of radiant heat being adjusted in relation to the rate of oxygen flow to achieve a temperature at the paper in the range of 350° C. to 550° C. when the varnish is decomposed, said heat intensity being sufficient to decompose the varnish to a stable water-insoluble and electrically conducting compound of indium coating the fibers of the glass sheet and producing a coating having high light-transmittance and high conductivity.

No references cited.